W. A. STEVENSON.
FLUID FLOW CONTROLLER.
APPLICATION FILED SEPT. 4, 1912.
1,146,457.
Patented July 13, 1915.
4 SHEETS—SHEET 4.
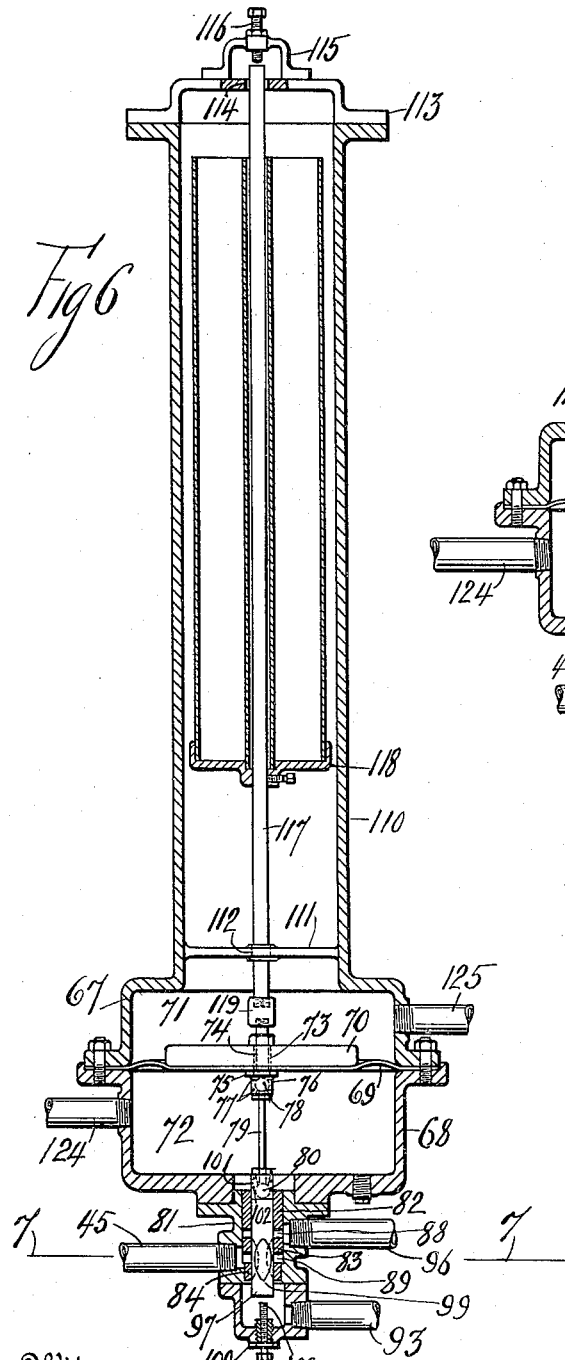
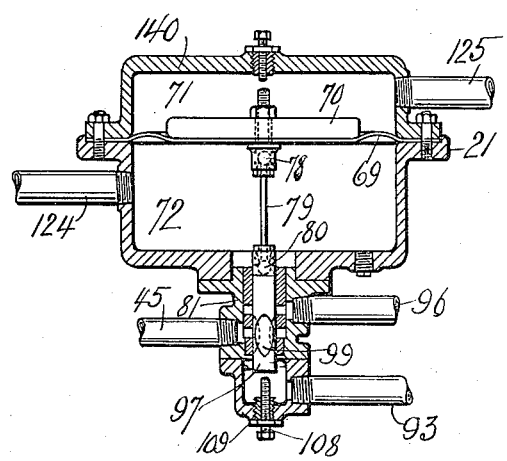
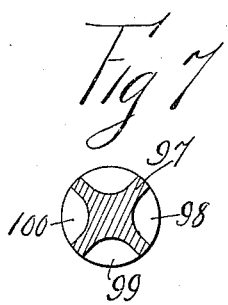

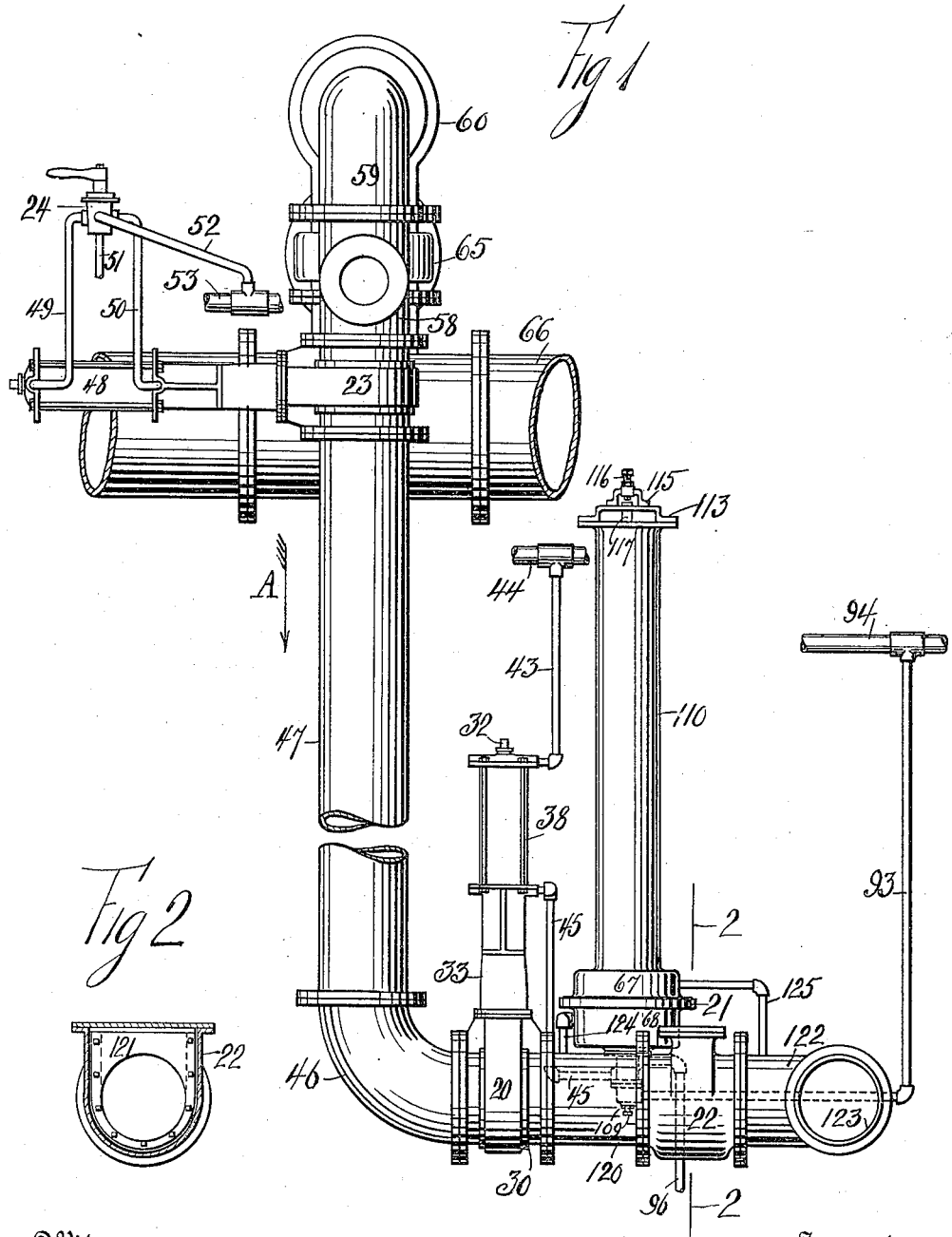

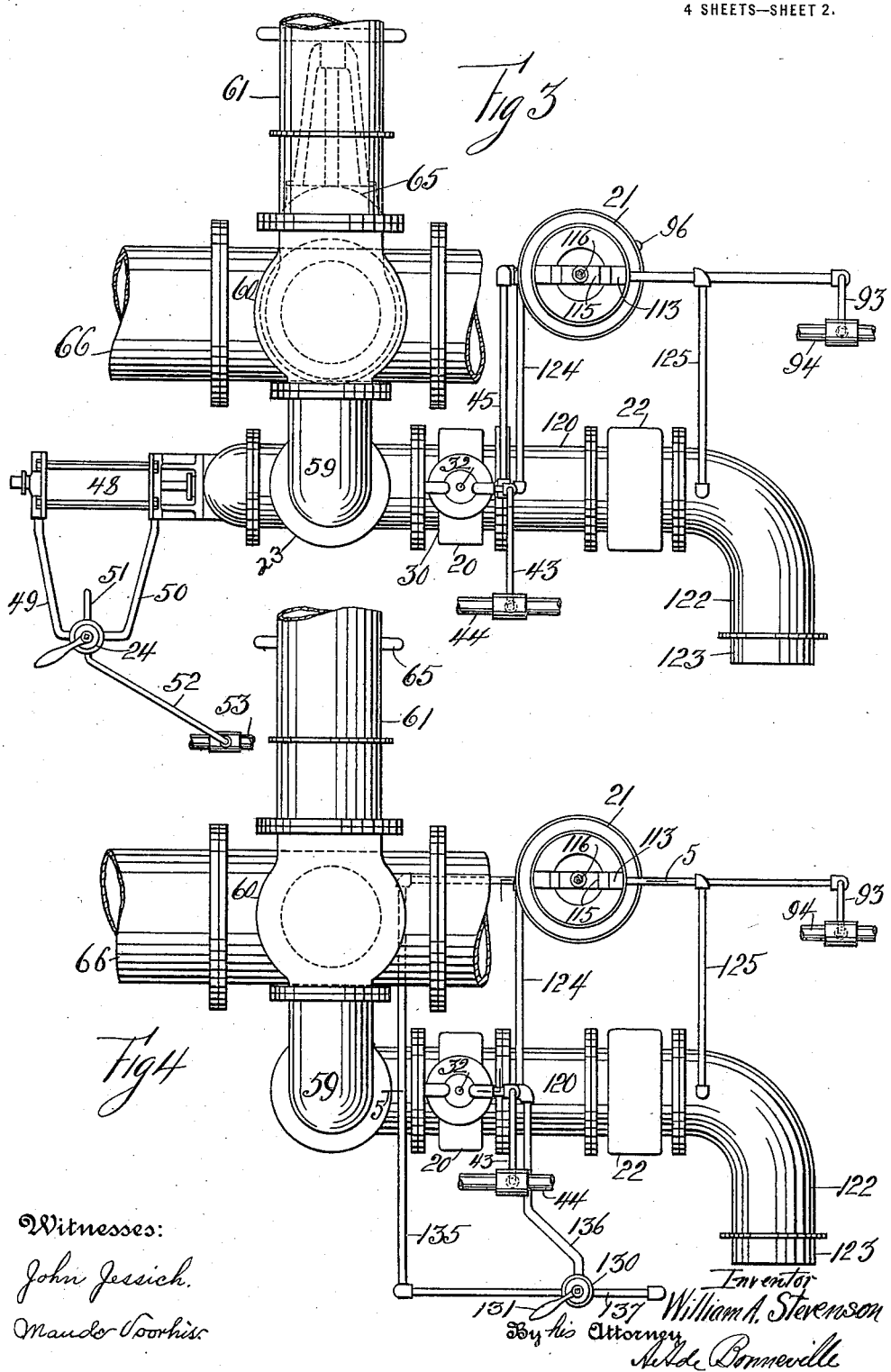

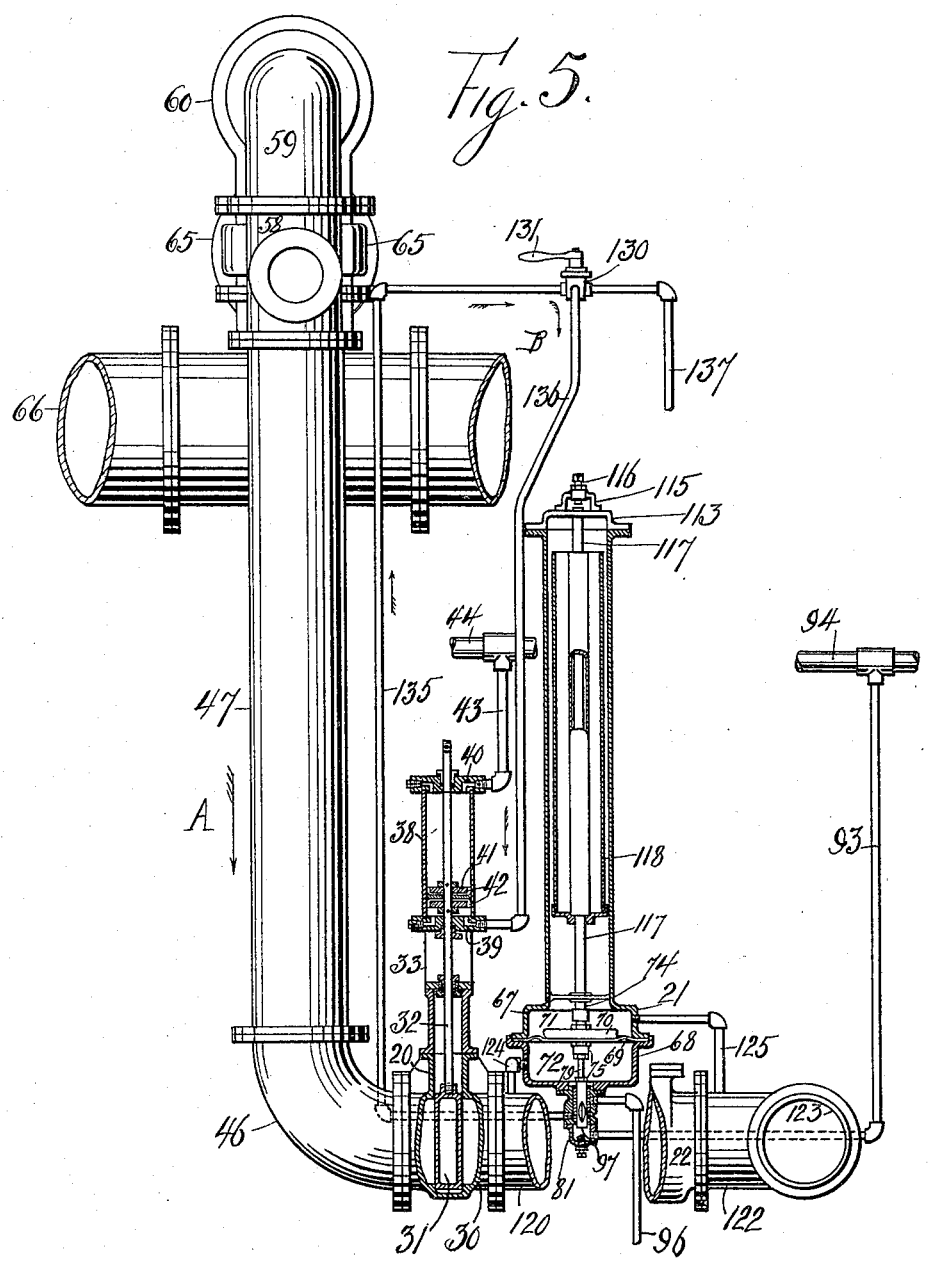

UNITED STATES PATENT OFFICE.

WILLIAM A. STEVENSON, OF NORTHAMPTON, MASSACHUSETTS.

FLUID-FLOW CONTROLLER.

1,146,457.

Specification of Letters Patent.

Patented July 13, 1915.

Application filed September 4, 1912. Serial No. 718,445.

*To all whom it may concern:*

Be it known that I, WILLIAM A. STEVENSON, a citizen of the United States, and resident of Northampton, in the county of Hampshire and State of Massachusetts, have invented certain new and useful Improvements in Fluid-Flow Controllers, of which the following is a specification.

This invention relates to improvements in apparatus for automatically controlling the rate of flow of a fluid, liquid or the like, particularly from one reservoir, filter or the like to another reservoir, clear well or the like.

The invention allows the head of the fluid in either reservoir to be varied.

The present application is exemplified with the piping leading from a filter and extending to a clear well, to show the operations and functions of the device.

The object of the invention in one of its forms is the production of an automatic fluid flow controller, that automatically regulates the rate of flow of a fluid through an orifice and maintains constant the difference of head caused by said orifice, so as to deliver a uniform quantity of fluid. The orifice may be varied in area, to be enabled to vary said difference of head.

The primary and essential object of the invention in its preferred form is the production of an automatic fluid flow controller, that will automatically deliver a fluid to a reservoir or clear well at a rate of flow equal to that taken from said reservoir or clear well, so as to maintain the head in the reservoir or clear well at a predetermined level which latter may be varied.

In the drawings Figure 1 represents an elevation of the invention with its piping in its preferred form, Fig. 2 shows a section of Fig. 1 on the line 2, 2, Fig. 3 shows a top plan view of Fig. 1, Fig. 4 shows a top plan view of a modification of the invention, Fig. 5 is an elevation of Fig. 4 with a partial section on the broken line 5, 5 thereof, Fig. 6 represents an enlarged partial section of the auxiliary controlling valve, Fig. 7 shows a partial enlarged section of Fig. 6 on the line 7, 7, and Fig. 8 represents an axial section of a modified auxiliary controlling valve.

The controlling or throttling valve 20 is of the floating gate type, actuated by a hydraulic piston connected therewith. It is represented with body 30, the gate 31 having the spindle 32. Upon the body 30 are supported the legs 33 of the hydraulic cylinder 38, having the port 39 at the lower end thereof and the port 40 at its upper end. A piston 41 with the packing 42 is secured to the spindle 32 within the cylinder 38. The port 40 has leading thereto the pipe 43 that connects with low pressure piping 44, and in Figs. 1 and 3 the port 39 has extending therefrom the conduit 45 that leads to the valve chamber of the D valve to be described.

The valve 20 has connected thereto the elbow 46 with the inlet conduit 47 and upon the latter is carried the stop valve 23. A cylinder 48 similar to the cylinder 38 is connected to the valve 23, and has ports at its ends for the pipes 49 and 50 that connect with ports of the four way valve 24. The valve 24 also has connected thereto the release or waste pipe 51, and the inlet pipe 52 that connects with the pressure piping 53.

A fitting 58 upon the valve 23 supports the elbow 59, that in turn is connected to the fitting 60. Discharge piping 61 from a filter connects with the fitting 60. A valve 65 connects the fitting 60 with a wash supply pipe 66.

The auxiliary regulating valve 21 comprises the upper member 67 and the lower member 68, between which is secured a flexible diaphragm 69 with the counterweight 70. The latter forms with said members the upper compartment 71 and the lower compartment 72. The counterweight 70 has a central opening 73 for a spindle 74 threaded at its upper end and that extends from a split bearing 75, having the cap 76 held in place by screws 77. The bearing 75 contains a spherical seat for the upper spherical end 78 of the link 79 and at the lower end of the latter is formed the spherical head 80.

A valve casing 81 extends from the member 68 and has a central longitudinal opening in which are located sleeves 82, 83 and 84 constituting valve seats and between which are formed the annular ports 88, 89. The casing 81 has a port for the conduit 45, a port for a pressure conduit 93 leading from the high pressure piping 94, and a port for the release conduit 96 that leads to the sewer or overflow receptacle.

A D valve 97 with the ports 98, 99, 100 slides on the sleeves 82, 83, 84 and the upper end of said valve is recessed for a cap 101 which is held in place by screws 102. A spherical seat is formed in the said cap and upper end of the D valve, for the spherical head 80. An adjustable bolt 108 with the jam nut 109, extends through the lower wall of the valve chamber 81, to prevent the D valve 97 descending too low. The member 67 has extending up therefrom the barrel 110 with the guide bar 111, having a central opening 112. A strap 113 with a central opening 114 is fastened to the top end of the barrel 110. A bracket 115 with the adjusting screw 116 is supported on the strap 113. The spindle 73 carries the coupling 119 which in turn carries the rod 117. A float 118 is secured to the said rod 117.

Adjacent to the valve 20 is located a fitting 120 and next to the latter is located the orifice box 22, that contains a removable orifice plate 121. Plates similar to 121 with orifices of different diameters are provided for the orifice box. An elbow 122 with the discharge piping 123 extends from said orifice box to lead the fluid to a clear well. Piping 124 connects the compartment 72 with the fitting 120 on one side of the said orifice box, and piping 125 connects the compartment 71 with elbow 122 on the other side of the orifice box.

To operate the appurtenances of the invention with the float 118, it will be noted that a fluid, or liquid enters and flows through the apparatus in the directions of the arrows A, the valve 23 being open and the valve 65 closed. For any predetermined rate of flow from the piping 61 to the piping 123, the plate with the requisite area of opening is placed in the orifice box 22. By virtue of the friction of the liquid flowing through the orifice in the plate in said orifice box 22 there is caused a predetermined loss of head or pressure, between the fluid in the piping 61 and the fluid in the piping 123. The compartment 72 being connected with the fitting 120, and the compartment 71 with the elbow 122, the differences of head or pressure in said compartments equals the difference of pressures in said fitting 120 and said elbow 122, the pressure in the compartment 72 being the greater. When the combined weights of the valve 97, counterweight 70, rod 117, float 118 and their immediate appurtenances is equal to this difference of head or pressure then the diaphragm 69 is in its normal position to maintain the ports of the valve 97 inoperative. With these conditions the D valve 97 is suspended in its valve chamber and maintains the conduit 45 disconnected from the conduits 93 and 96.

If the rate of flow through the controller increases, the area of the orifice in the orifice box 22 remaining the same, then the pressure is raised in the fitting 120 and consequently in the compartment 72, thereby raising the diaphragm 69 and the D valve 97. In this raised position the ports of the D valve 97 connect the release conduit 96 with the conduit 45, lowering the pressure under the piston 41 in the cylinder 38, and then the pressure upon the top of said piston from the pipe 43 and piping 44 begins to lower the gate 31. By the lowering of said gate the flow of the liquid is gradually reduced, until the difference of pressures on the opposite sides of the orifice box is such as to again maintain the equilibrium of the diaphragm 69, when the ports of the D valve 97 will again disconnect the conduit 45 from the conduits 93 and 96.

If the rate of flow through the controller decreases the pressure decreases in fitting 120 and in the compartment 72, thereby lowering the diaphragm 69 with the D valve 97. In this lowered position the ports of the D valve connect the conduits 45 and 93, and thereby increase the pressure under the piston 41 raising the gate 31, by virtue of which the rate of flow is increased, until the difference of pressures on the opposite ends of the orifice box again maintains the D valve in its normal position of equilibrium.

So far the operation of the invention has only been considered with reference to varying quantities of fluid led thereto through the conduit 47 and its connections. The essential and most novel elements of the invention will now be considered, that is to say the functions of its elements to maintain a constant level or head of fluid in the reservoir or clear well into which the water is discharged by the piping 123, when the ratio of extracting fluid from said reservoir is less than the ratio of supplying said reservoir with fluid compared with the normal rating of the controller. In addition to the reciprocations imparted to the valve 97 by the variations of pressure in the compartment 72, due to an increased rate of flow through the controller, the said valve 97 is also actuated by the buoyancy of the float 118, when the water or fluid rises in said reservoir high enough to lift the float 118 in the barrel 110. Up to this level of the water in the reservoir, the float plays absolutely no function in the operation of the controller except to assist in weighting the diaphragm.

When the level of the water in the clear well or reservoir into which the water is discharged rises to the desired high water mark, the buoyancy of the float 118 will exert an upward force upon the rod 117 and hence upon the diaphragm 69, as the head of water above the lower end of the float 118 increases, and this force will increase directly with said head. This causes connection between the two conduits 45 and 96, which will produce a closing of the valve 20.

The flow therefor through the valve 20 will gradually be reduced as the head above the lower end of the float 118 increases and it will become zero when the head attains a value such that the buoyancy of the float 118 due to its submergence equals the weight of the diaphragm and attached parts. This, of course, produces a smaller difference of pressures in the fitting 120 and elbow 122, with a corresponding decrease in the amount of water or fluid passing through the discharge piping 123. When the counterweight 70 and the other elements carried by the diaphragm 69 just balance, the requisite head in the compartment 72 to maintain the predetermined rate of flow through the controller, and the quantity of fluid taken from the clear well or reservoir is equal to the quantity of fluid passing through the controller, then the float 118 with the diaphragm 69 maintains the valve 97 in its position of equilibrium with the ports of said valve inoperative. If the quantity of fluid taken from the clear well or reservoir becomes less than the quantity flowing into the reservoir through the controller, the level of the water in the clear well or reservoir will rise, and the buoyancy of the float 118 will cause the gate 31 of the valve 20 to lower. If no water is drawn from the reservoir, then the water or fluid will rise in the barrel 110 and the buoyancy of the float 118 will entirely relieve the diaphragm of the effect of the counterweight 70 and other elements carried thereon, thereby causing a connection between the conduits 45 and 96 which will cause the gate 31 to entirely close, thereby preventing the water passing through the controller.

If the level of the water in the clear well or reservoir falls below the high water mark at which point the gate 31 has been completely closed, then the float 118 which has been buoyed up by this level of the water will fall carrying with it the diaphragm and the valve 97. This will cause a gradual connection between the conduits 93 and 45, by reason of which the gate will rise to increase the flow through the controller. The rate of flow through the controller at this instant will be equivalent to the amount of water drawn from the reservoir. The float 118, it will be noted, maintains the reservoir between a maximum and normal level when the rate controller is not operating at full capacity irrespective of the quantity of water drawn therefrom, prevents the reservoir from overflowing, and operates between the minimum and maximum rate without jar or sudden movement; that is, the increase from minimum to maximum rating is gradual.

When the water falls below the normal height in the reservoir, the action of the float 118 is entirely eliminated except in so far as it is an additional counterweight on the diaphragm 69. Below the normal level in the reservoir the controller maintains a constant flow of fluid into the reservoir irrespective of the varying height of fluid in said reservoir.

Referring particularly to Figs. 4 and 5, the stop valve 23 can be omitted and its functions performed by the controlling and stop valve 20 in conjunction with the three way valve 130 having the operating handle 131. The piping 124, 125 respectively lead from the chambers 72 and 71 to opposite sides of the orifice box 22 as already described. The conduit 45 is replaced by the conduit 135 and conducts fluid under pressure from the valve chamber 81, to the chamber of the three-way valve 130. When the handle 131 is placed in proper position, a conduit 136 conducts the fluid in the direction of the arrows B, from the valve 130 to the lower side of the piston 41 in the cylinder 38. A release pipe 137 also extends from said valve 130.

Under normal conditions with the ports in the valve 130 located to connect the conduits 135, 136 the piston 41 is controlled as already described, but if the gate 31 is to be closed the operating handle 131 is turned to close the connection between the conduits 135 and 136, and open the connection between the conduits 136 and the release pipe 137. Then the pressure on top of the piston 41 obtained by the pressure of the fluid in the pipe 43 will cause said piston to descend and close the gate 31 of the valve 20.

Referring to Fig. 8 the auxiliary regulating valve 21 is shown with the upper member 140 in place of the member 67, dispensing with the barrel 110, its float 118 and its other appurtenances, thereby eliminating the function of controlling the diaphragm by means of the height of the water in the clear well or reservoir into which the water is discharged from the piping 123.

In this modification of the invention the D valve 97 is actuated by the variations of pressure in the compartment 72, due to the variations of the head of water fed by the conduit 47 and its connections.

In place of the orifice box 22, a gate valve or other equivalent means may be employed to vary the head of the fluid controlled by the apparatus.

Another novel function of the float 118 consists in the fact that the height or depth of the water, in the clear well or reservoir into which the water is discharged may be maintained constant at different levels. This is accomplished by locating the auxiliary regulating valve 21 with its float 118 at different levels by simply changing its pipe connections with the other portions of the invention. The said auxiliary valve thereby becomes detachable. Therefore different quantities of water may be withdrawn from the reservoir and the level maintained for the said quantities of withdrawal.

Before the level of the water has reached a sufficient height to affect the float 118, the flow is controlled by the pressure in the compartment 72 resulting from the pressure caused by the orifice of the orifice plate in the box 22. When the level of the water raises the float to the upper end of its stroke, the release of water pressure through the conduit 96, will allow the pressure from the pipe 43 to close the gate 31.

Having described my invention what I desire to secure by Letters Patent and claim is:

1. In a fluid flow controller the combination of a main throttling valve, an orifice box on the discharge side of said main valve, an auxiliary regulating valve for the controller, a flexible diaphragm coacting with said auxiliary regulating valve, a float coacting with said diaphragm, means whereby said float coacts with the fluid discharged from the controller on the discharge side of the orifice box on one side of said diaphragm and means to exert the pressure of the fluid on the discharge side of the main valve and on the inlet side of the orifice box on the opposite side of said diaphragm, the said auxiliary valve controlling a fluid to actuate the said main valve.

2. In a fluid flow controller the combination of a main throttling valve, a cylinder for said valve, a piston in the cylinder, an auxiliary regulating valve for the controller, a flexible diaphragm for said auxiliary valve, a barrel over the diaphragm, a float connected to the diaphragm in said barrel, an orifice box for the controller, piping extending from the discharge side of said box to said barrel, piping extending from the inlet side of said box to the auxiliary valve and below said diaphragm, and a conduit extending from the auxiliary valve to the cylinder and below the under side of said piston.

3. In a fluid flow controller the combination of a main throttling valve, a piston for the throttling valve, an auxiliary regulating valve for the controller, a flexible diaphragm for said auxiliary valve, an upper compartment on one side of said diaphragm, a lower compartment on the under side of said diaphragm, an orifice box on the discharge side of the said main throttling valve, piping in the controller extending from one side of said box to the said upper compartment, piping in the controller extending from the other side of said orifice box to the other compartment, a barrel extending above said upper compartment, a float in said barrel connected to said diaphragm, a conduit extending from the auxiliary valve to the under side of the piston, a pressure conduit for the auxiliary valve and a pipe for a fluid under pressure leading to the top side of said piston.

4. In a fluid flow controller the combination of a main throttling valve, a cylinder for the valve, a piston for said cylinder, an auxiliary regulating valve for the controller, an orifice box on the discharge side of the said main valve, the auxiliary valve actuated by the fluctuations of the head of the fluid after it leaves the said main throttling valve, a pressure conduit leading to the auxiliary valve, a three-way valve, a conduit connecting the auxiliary valve and said three-way valve, and a conduit leading from the three-way valve to the under side of the piston in said cylinder.

5. In a fluid flow controller the combination of a main throttling valve, a cylinder for the valve, a piston for said cylinder, an auxiliary regulating valve for the controller, an orifice box on the discharge side of the said main valve, the auxiliary valve actuated by the fluctuations of the head of the fluid after it leaves the said main throttling valve, a pressure conduit leading to the auxiliary valve, a three-way valve, a conduit connecting the auxiliary valve and said three-way valve, a conduit leading from the three-way valve to the cylinder below the under side of the piston therein, and a pipe for fluid under pressure connected to the cylinder above the upper side of said piston.

6. In a fluid flow controller the combination of a main throttling valve, a cylinder for said valve, a piston in the cylinder connected to the valve, an auxiliary regulating valve for the controller, a flexible diaphragm for the latter valve, an upper compartment on one side of said diaphragm, a lower compartment on the other side of said diaphragm, a float connected to the diaphragm over the upper compartment, means to connect the upper compartment with the fluid discharged by the controller to actuate said float, piping extending from the discharge side of the main valve to the said lower compartment, a pipe for high pressure connected to the auxiliary valve, a conduit connecting the auxiliary valve and said cylinder below its piston and a pipe for low pressure connected to said cylinder above the piston therein.

Signed at Northampton in the county of Hampshire and State of Massachusetts this 23rd day of August A. D. 1912.

WILLIAM A. STEVENSON.

Witnesses:
W. E. TITCOMB,
H. B. HAVEN.